(12) United States Patent
Shiina et al.

(10) Patent No.: US 11,454,565 B2
(45) Date of Patent: Sep. 27, 2022

(54) SEAL APPARATUS

(71) Applicant: SANOH INDUSTRIAL CO., LTD., Tokyo (JP)

(72) Inventors: Mitsuharu Shiina, Koga (JP); Miyuki Takahashi, Koga (JP); Kazuyuki Haraga, Koga (JP); Hideharu Shimura, Osaka (JP); Yasuyuki Kunugiza, Osaka (JP); Yorichika Takizawa, Osaka (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 566 days.

(21) Appl. No.: 16/483,624

(22) PCT Filed: Mar. 7, 2018

(86) PCT No.: PCT/JP2018/008704
§ 371 (c)(1),
(2) Date: Aug. 5, 2019

(87) PCT Pub. No.: WO2018/193737
PCT Pub. Date: Oct. 25, 2018

(65) Prior Publication Data
US 2020/0032933 A1 Jan. 30, 2020

(30) Foreign Application Priority Data
Apr. 19, 2017 (JP) .............................. JP2017-083236

(51) Int. Cl.
*G01M 3/28* (2006.01)
*G01M 3/02* (2006.01)
(Continued)

(52) U.S. Cl.
CPC .......... *G01M 3/2815* (2013.01); *G01M 3/022* (2013.01); *F16L 15/003* (2013.01);
(Continued)

(58) Field of Classification Search
CPC ............. G01M 3/2807; G01M 3/2815; G01M 3/2846; G01M 3/2853; G01M 3/2884;
(Continued)

(56) References Cited

U.S. PATENT DOCUMENTS

| | | | | |
|---|---|---|---|---|
| 3,499,469 A | * | 3/1970 | North .................... | F16L 17/00 73/49.1 |
| 4,518,955 A | * | 5/1985 | Meyer ................. | G01M 3/2807 137/460 |

(Continued)

FOREIGN PATENT DOCUMENTS

| | | |
|---|---|---|
| JP | H04-174334 A | 6/1992 |
| JP | H11-351409 A | 12/1999 |

(Continued)

OTHER PUBLICATIONS

International Search Report of the International Searching Authority dated May 22, 2018 for the corresponding International application No. PCT/JP2018/008704 (and English translation).

*Primary Examiner* — Nicholas L Foster
(74) *Attorney, Agent, or Firm* — Posz Law Group, PLC (57) ABSTRACT

A seal apparatus provides sufficient sealing and is compact and inexpensive. The seal apparatus includes a thread part screwed to the screw fastening part of a hollow component; a seal part that moves along an axis of the screw part and comes into pressure contact with the screw fastening part of the hollow component; a stopper part fixed to the screw part that restricts the movement of the seal part; a pressed part that moves the seal part into pressure contact with the screw fastening part; a spring disposed between the pressed part and the stopper part; and an accumulator formed between the stopper part and the seal part and into which a test fluid which is introduced into the hollow component for inspection flows.

4 Claims, 10 Drawing Sheets

(51) Int. Cl.
*F16L 15/00* (2006.01)
*F16L 15/04* (2006.01)

(52) U.S. Cl.
CPC ........... *F16L 15/04* (2013.01); *F16L 2201/30* (2013.01); *G01M 3/28* (2013.01)

(58) Field of Classification Search
CPC ..... G01M 3/022; G01M 3/28; F16L 2201/30; F16L 55/1108; F16L 55/1152
See application file for complete search history.

(56) References Cited

U.S. PATENT DOCUMENTS

| | | | | |
|---|---|---|---|---|
| 4,581,919 | A * | 4/1986 | Sullivan | G01M 3/2853 |
| | | | | 73/40.5 R |
| 5,118,140 | A * | 6/1992 | Racine | F16L 37/0927 |
| | | | | 73/49.1 |
| 8,151,628 | B1 * | 4/2012 | Smida | G01M 3/022 |
| | | | | 73/40 |
| 8,584,511 | B2 * | 11/2013 | Smida | G01M 3/26 |
| | | | | 73/40 |
| 9,316,560 | B2 * | 4/2016 | Smida | G01M 3/022 |
| 9,541,466 | B2 * | 1/2017 | Kawasaki | G01M 3/02 |
| 2012/0174654 | A1 * | 7/2012 | Smida | G01M 3/26 |
| | | | | 73/37 |
| 2015/0168248 | A1 * | 6/2015 | Kawasaki | G01M 3/022 |
| | | | | 73/49.3 |

FOREIGN PATENT DOCUMENTS

| | | | | |
|---|---|---|---|---|
| JP | 2015-232457 A | | 12/2015 | |
| KR | 2015018129 A | * | 2/2015 | ............ G01M 3/022 |

\* cited by examiner

SEAL APPARATUS

CROSS REFERENCE TO RELATED APPLICATIONS

This application is a U.S. national stage of International Patent Application No. PCT/JP2018/008704 filed on Mar. 7, 2018 and is based on Japanese Patent Application No. 2017-083236 filed on Apr. 19, 2017, the disclosures of which are incorporated herein by reference.

TECHNICAL FIELD

The present invention relates to seal apparatuses for hollow components, and particularly to a seal apparatus for sealing a screw fastening part of a hollow component in a gas-tightness inspection.

BACKGROUND ART

For hollow components manufactured by brazing or the like, for example, a fuel delivery pipe to which an injector of a vehicle engine is attached or the like, a gas-tightness inspection is performed on all their products after manufactured. In the gas-tightness inspection, the gas-tightness of the hollow component is checked by a method in which, for example, the opening of the hollow component is completely closed by a seal apparatus; high pressure helium gas is injected into the hollow component; and the pressure after a predetermined time is measured with a pressure gauge.

As seal apparatuses for sealing a screw fastening part of the hollow component in such a gas-tightness inspection, apparatuses disclosed in, for example, PTL 1 and PTL 2 have been proposed.

The apparatus disclosed in PTL 1 includes a cylindrical housing having a bottom; a primary piston provided in the housing so that a primary pressure chamber is formed between the primary piston and the housing, the primary piston being configured to be slid by introduction of a pressure fluid into the primary pressure chamber; a seal ring provided adjacent to the primary piston on an opening portion side of the housing, the seal ring being compressively deformed depending on a sliding displacement of the primary piston so that its inner circumferential surface comes into pressure contact with a neck lower part of a flange part of the injection port; an auxiliary piston provided at a central portion of the primary piston so that a secondary pressure chamber is formed between the auxiliary piston and the primary piston, the auxiliary piston being configured to be slid by introduction of a pressure fluid into the secondary pressure chamber; an orifice provided in a passage connecting the primary pressure chamber and the secondary pressure chamber; and a seal rubber provided adjacent to the auxiliary piston in the primary piston, the seal rubber being pressed by a sliding displacement of the primary piston to come into pressure contact with a tip opening surface of the injection port.

On the other hand, the apparatus disclosed in PTL 2 includes a connection main body to be fixed to a fluid device, and a projecting and retracting member configured to project and retract with respect to the connection main body, the apparatus being configured to seal between the fluid device and the connection main body by pressing the projecting and retracting member against the fluid device with the fluid pressure of a pressurized fluid supplied to the fluid device.

CITATION LIST

Patent Literature

[PTL 1] Japanese Patent Application Publication No. H04-174334
[PTL 2] Japanese Patent Application Publication No. H11-351409

SUMMARY OF INVENTION

Technical Problem

Incidentally, the apparatus disclosed in PTL 1 described above is an apparatus providing excellent sealing, but in which a pressurized fluid other than the test fluid flows in the seal part, and the pressure caused by the flow presses the seal part against a closed part of the inspection object. As a result, it requires an additional apparatus to generate and flow the pressurized fluid, thereby making the apparatus large in size and expensive as a whole.

On the other hand, the apparatus disclosed in PTL 2 has a so-called self-sealing structure which includes the connection main body to be fixed to a fluid device and the projecting and retracting member configured to project and retract with respect to the connection main body, and presses the projecting and retracting member against the fluid device with the fluid pressure of a pressurized fluid supplied to the fluid device, so it does not require an additional apparatus to generate and flow the pressurized fluid as in the apparatus in PTL 1, and solves the problem in PTL 1. However, the sealing of the inspection object is not ensured in the initial state before the test fluid flows, and there is still room for improvement.

The present invention has been made in view of the actual circumstances of the above-described background art, and it is an object of the present invention to provide a seal apparatus that provides sufficient sealing and can be made to be compact and inexpensive as a whole.

Solution to Problem

To achieve the above object, the present invention is directed to a seal apparatus defined in the following [1] to [4].

[1] A seal apparatus for sealing a screw fastening part of a hollow component in a gas-tightness inspection, including: a screw part that is screwed to the screw fastening part of the hollow component; a seal part that moves along an axis of the screw part and comes into pressure contact with the screw fastening part of the hollow component; a stopper part that is fixed to the screw part and restricts the movement of the seal part; a pressed part that receives an external force to move along the axis of the screw part and moves the seal part toward the screw fastening part so that the seal part comes into pressure contact with the screw fastening part; a spring that is disposed between the pressed part and the stopper part; and an accumulator that is formed between the stopper part and the seal part and into which a test fluid which is introduced into the hollow component for inspection flows.

[2] The seal apparatus according to [1], wherein a second spring is disposed between the pressed part and the seal part.

[3] The seal apparatus according to [1] or [2], wherein the screw part is an internal thread, and a flow passage communicating with the accumulator is formed in the seal part disposed inside a cylindrical body in which the internal thread is formed.

[4] The seal apparatus according to [1] or [2], wherein the screw part is an external thread, and a flow passage communicating with the accumulator is formed in a rod body on which the external thread is formed.

Advantageous Effects of Invention

According to the seal apparatus according to the present invention described above, sufficient sealing is provided, and the apparatus can be made to be compact and inexpensive as a whole.

The seal apparatus according to the present invention includes not only the screw part that is screwed to the screw fastening part of the hollow component but also the pressed part that receives an external force to move along the axis of the screw part and moves the seal part toward the screw fastening part so that the seal part comes into pressure contact with the screw fastening part. This causes no twisting or wear on the seal part due to contact with the screw fastening part when the screw part is screwed to the screw fastening part of the hollow component, resulting in improved durability of the seal part. On the other hand, in the inspection, the pressed part receives an external force to move so that the seal part comes into pressure contact with the screw fastening part, thereby making it possible to achieve initial sealing. In addition, the seal apparatus according to the present invention includes the accumulator that is formed between the stopper part and the seal part and into which a test fluid which is introduced into the hollow component for inspection flows, thereby making it possible to achieve not only the sealing caused by the pressed part but also strong self-sealing using the pressure of the test fluid introduced to the accumulator in the inspection. As a result, the apparatus provides sufficient sealing and can be made to be compact and inexpensive without an additional apparatus to generate and flow a pressurized fluid.

DESCRIPTION OF EMBODIMENTS

Embodiments of a seal apparatus according to the present invention will be described below in detail with reference to the drawings. Here, the drawings illustrate examples in which the seal apparatus according to the present invention is applied for the sealing of a screw fastening part of a fuel delivery pipe to which an injector of a vehicle engine is attached.

In a fuel delivery pipe 1, a plurality of injector cups 3 are fixed to a pipe main body 2 by brazing, and a screw fastening part 4 for connecting a fuel pipe, a pressure sensor, and the like is fixed by brazing.

In a gas-tightness inspection performed, the gas-tightness of the fuel delivery pipe is checked by a method in which the opening of the injector cup 3 fixed to the fuel delivery pipe 1 and the opening of the screw fastening part 4 are each closed by the seal apparatus to achieve gas-tightness; the high-pressure test fluid (for example, helium gas of 25 MPa) is injected into the pipe main body 2; and the pressure after a predetermined time is measured with a pressure gauge.

Figure 1:
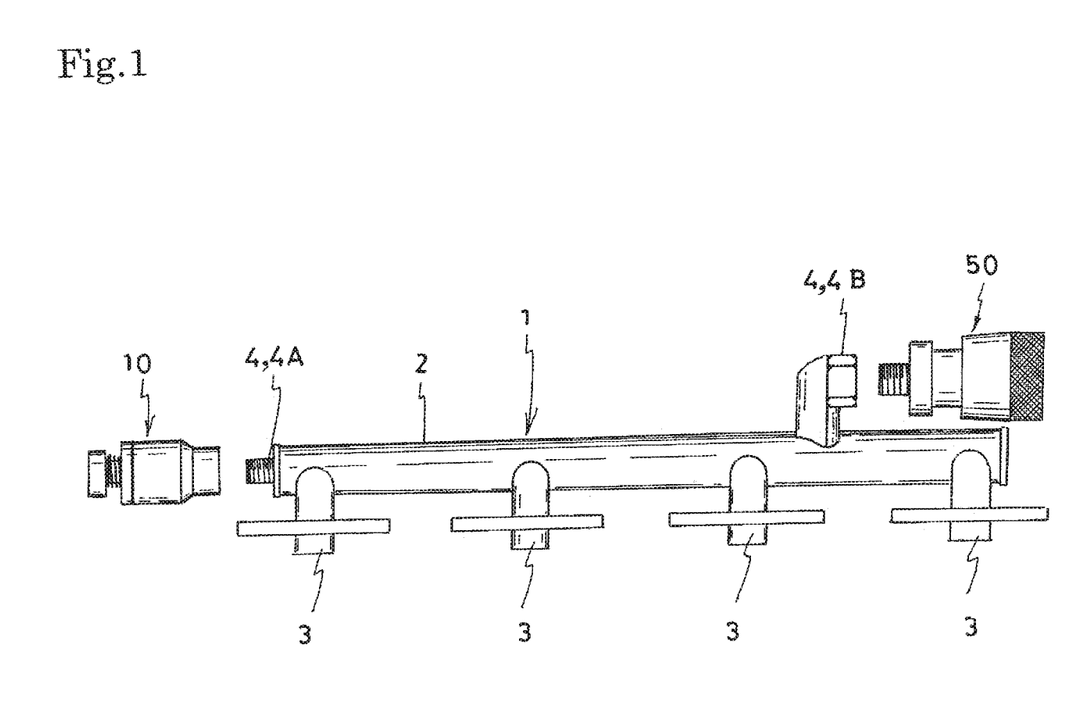
FIG. 1 illustrates an example in which a seal apparatus according to the present invention is applied for sealing a screw fastening part of a fuel delivery pipe, and is a conceptual side view illustrating a state before the attachment of the seal apparatus.
Figure 2:
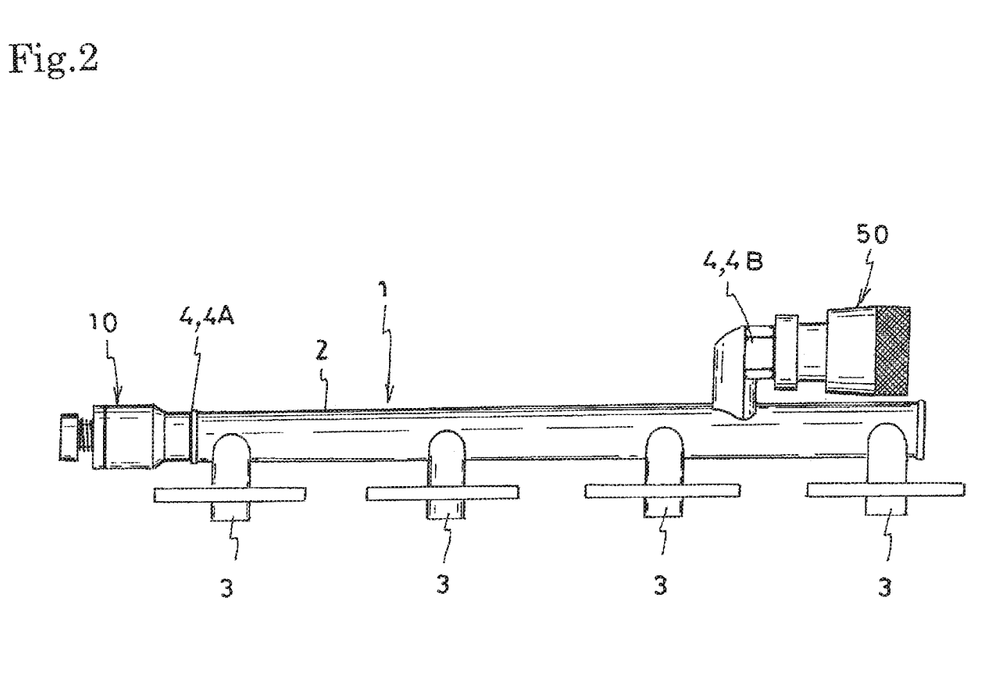
FIG. 2 illustrates an example in which a seal apparatus according to the present invention is applied for sealing a screw fastening part of a fuel delivery pipe, and is a conceptual side view illustrating a state after the attachment of the seal apparatus.

The seal apparatus according to the present invention relates to a seal apparatus for sealing a screw fastening part of a hollow component in the above-mentioned gas-tightness inspection. In FIGS. 1 and 2, 10 represents an embodiment of the seal apparatus for sealing a screw fastening part 4A of an external thread of the fuel delivery pipe 1, and 50 represents an embodiment of the seal apparatus for sealing a screw fastening part 4B of an internal thread of the fuel delivery pipe 1.

Figure 3:
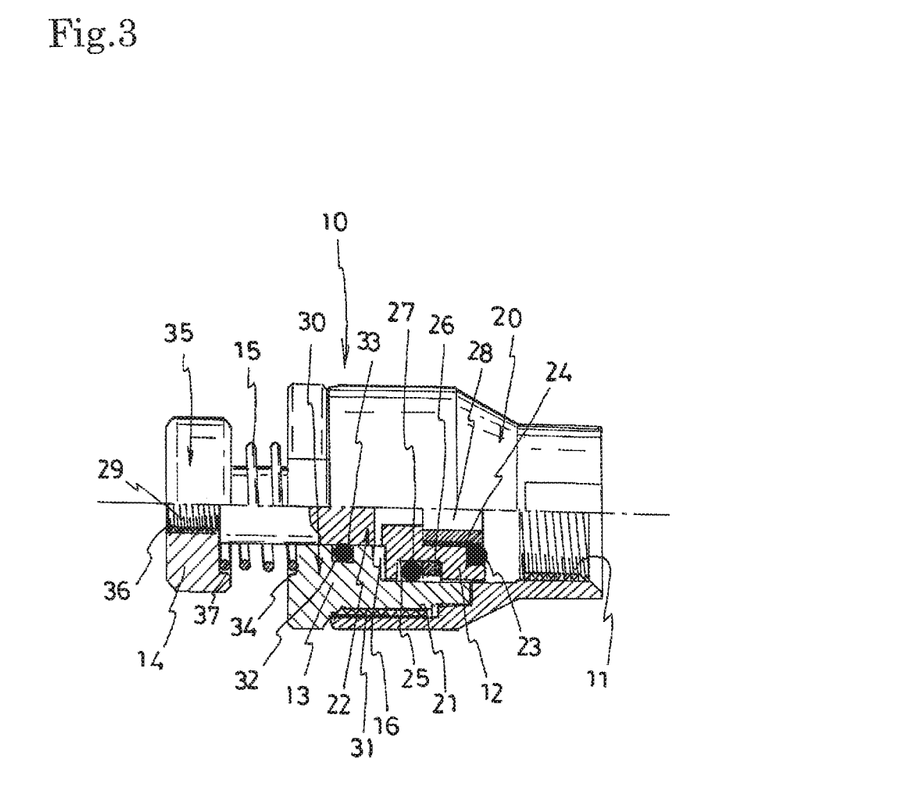
FIG. 3 is a half section side view illustrating one embodiment of the seal apparatus according to the present invention that seals the screw fastening part of an external thread of the fuel delivery pipe.
Figure 4:
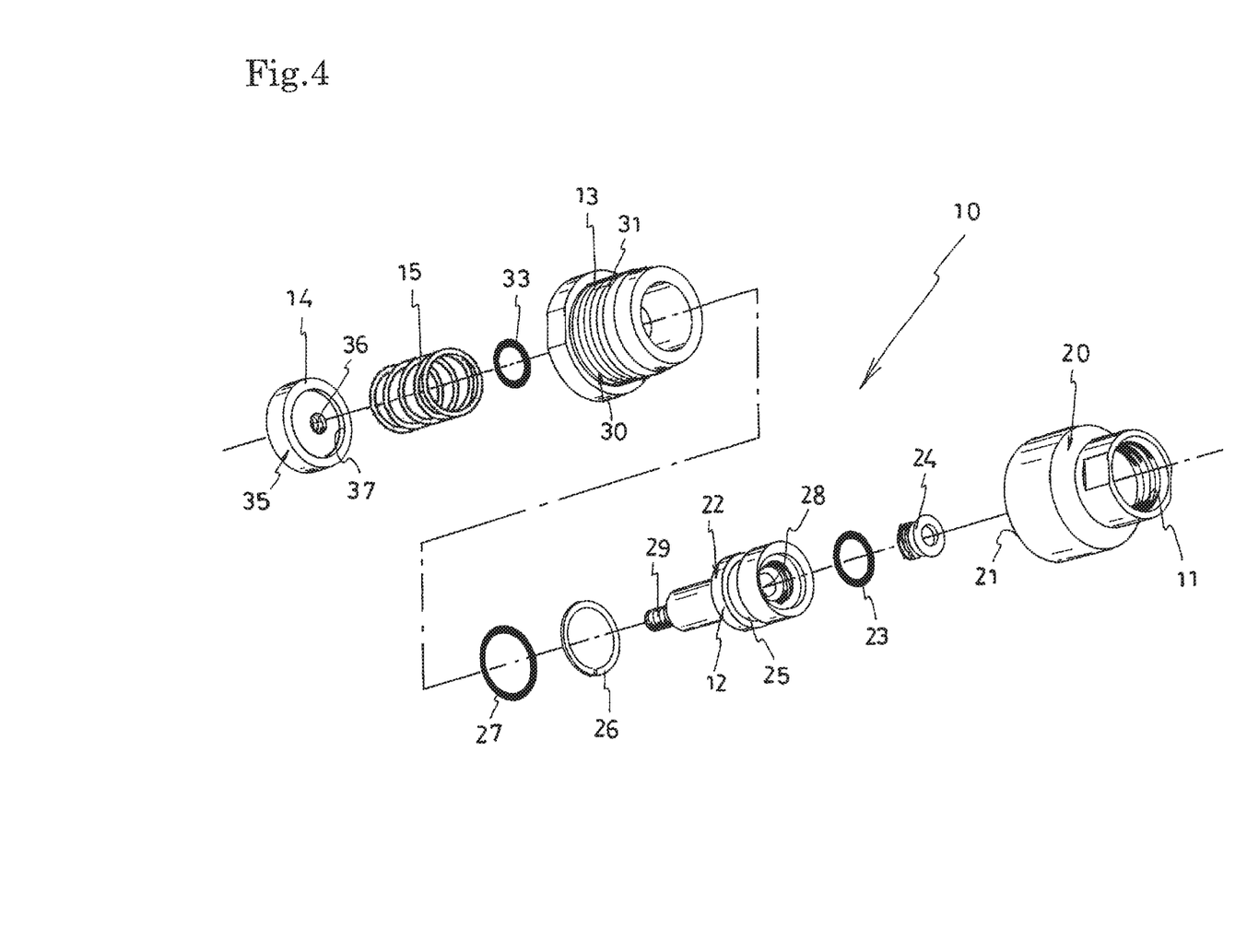
FIG. 4 is an exploded perspective view of the seal apparatus illustrated in FIG. 3.

First, the structure of the seal apparatus 10 for sealing the screw fastening part 4A of the external thread of the fuel delivery pipe 1 according to the present invention will be described in detail with reference to FIGS. 3 and 4.

The illustrated seal apparatus 10 includes an internal thread part 11 that is screwed to the screw fastening part 4A of the external thread of the fuel delivery pipe; a seal part 12 that moves along the axis of the internal thread part 11 to be pressed into contact with the screw fastening part 4A of the fuel delivery pipe; a stopper part 13 that is fixed to the internal thread part 11 and restricts the movement of the seal part 12; a pressed part 14 that receives an external force to move along the axis of the internal thread part 11 and moves the seal part 12 toward the screw fastening part 4A so that the seal part 12 is pressed into contact with the screw fastening part 4A; a spring 15 that is disposed between the pressed part 14 and the stopper part 13; and an accumulator 16 that is formed between the stopper part 13 and the seal part 12 and into which a test fluid G which is introduced into the fuel delivery pipe for inspection flows.

The internal thread part 11 screwed to the screw fastening part 4A of the external thread of the fuel delivery pipe is formed on the front inner peripheral surface of a cylindrical body 20 having an enlarged diameter on the rear side, and an internal thread 21 screwed to the stopper part 13 is formed on the rear inner peripheral surface of the cylindrical body 20 having an enlarged diameter.

The seal part 12, which moves along the axis of the internal thread part 11 to be pressed into contact with the screw fastening part 4A of the fuel delivery pipe, is formed on a rod body 22 having a bulging part on the front side. An O-ring 23 is attached to the front end of the bulging part by a cylindrical screw 24. A backup ring 26 and an O-ring 27 are attached to a recessed groove 25 formed on the outer periphery of the bulging part to achieve sealing with the stopper part 13. Further, a passage 28 along the axis is formed at the front of the rod body 22, and an external thread 29 for screwing the pressed part 14 is formed at the rear end.

The stopper part 13, which restricts the movement of the seal part 12, is formed in a cylindrical body 30 having a projecting step part at its rear end and having an enlarged diameter step part at its front inner periphery. On the outer periphery of the cylindrical body 30, an external thread 31 is formed to be screwed to the internal thread 21 formed on the rear inner peripheral surface of the cylindrical body 20 having the internal thread part 11. By screwing the thread 31 to the thread 21, the internal thread part 11 and the stopper part 13 are fixed. Further, the rod body 22 having the seal part 12 is inserted into the cylindrical body 30 having the stopper part 13, and an O-ring 33 attached to a recessed groove 32 formed on the inner peripheral surface of the cylindrical body 30 achieves the sealing of the rod body 22 having the inserted seal part 12. A recessed part 34 into which the front end of the spring 15 is inserted is formed on the rear end face of the cylindrical body 30.

The pressed part 14, which receives an external force to move along the axis of the internal thread part 11 and moves the seal part 12 toward the screw fastening part 4A so that the seal part 12 is pressed into contact with the screw fastening part 4A, is formed in a disk 35. In a through hole formed at the center of the disk 35, an internal thread 36 is formed to be screwed to the external thread 29 formed at the rear end of the rod body 22 having the seal part 12. By screwing the thread 29 into the thread 36, the pressed part 14 is fixed to the seal part 12. Further, a recessed part 37 into which the rear end of the spring 15 is inserted is formed on the front end face of the disk 35.

The spring 15 is disposed between the recessed part 37 formed on the front end face of the disk 35 having the pressed part 14 and the recessed part 34 formed on the rear end face of the cylindrical body 30 having the stopper part 13 with the spring 15 wound around the outer periphery of the rod body 22 having the seal part 12. Further, the accumulator 16, which is formed between the stopper part 13 and the seal part 12 and into which the test fluid G which is introduced into the fuel delivery pipe for inspection flows, communicates with the inside of the cylindrical body 20 in which the internal thread part 11 is formed by the passage 28 formed on the front side of the rod body 22 having the seal part 12.

The seal apparatus 10 according to the present invention configured as described above is attached to the screw fastening part 4A of the external thread of the fuel delivery pipe 1 to perform a gas-tightness inspection as follows.

Figure 5:
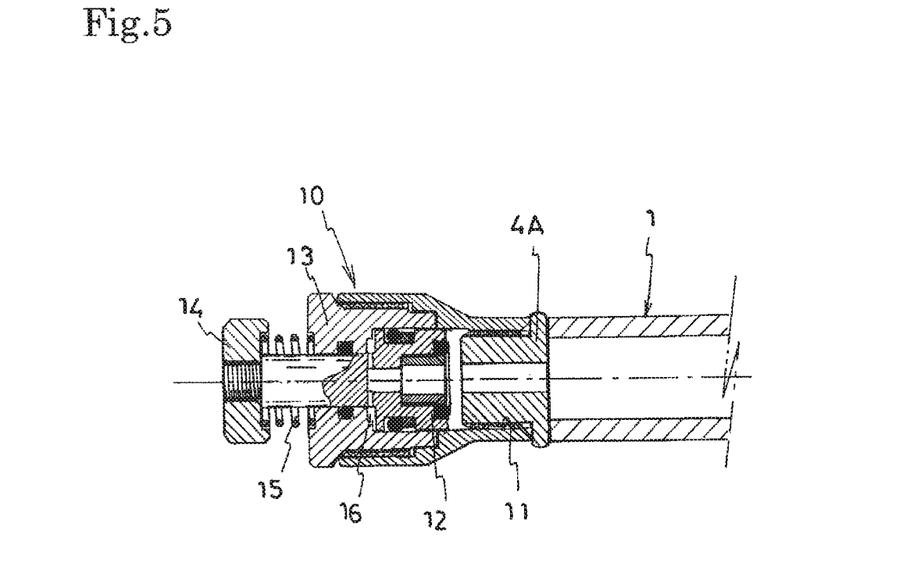
FIG. 5 is a cross-sectional view illustrating a state where the seal apparatus illustrated in FIG. 3 is attached to the screw fastening part of the external thread of the fuel delivery pipe.

First, as illustrated in FIG. 5, the internal thread part 11 of the seal apparatus 10 according to the present invention is screwed to the screw fastening part 4A of the external thread of the fuel delivery pipe 1 to attach the seal apparatus 10 to the screw fastening part 4A. At this time, there is a gap between the seal part 12 of the seal apparatus 10 according to the present invention and the screw fastening part 4A of the inspection object, and the seal part 12 does not come in contact with the screw fastening part 4A accordingly. Thus, there is no occurrence of twisting or wear in the seal part 12, and the durability of the seal part 12 is improved.

Figure 6:
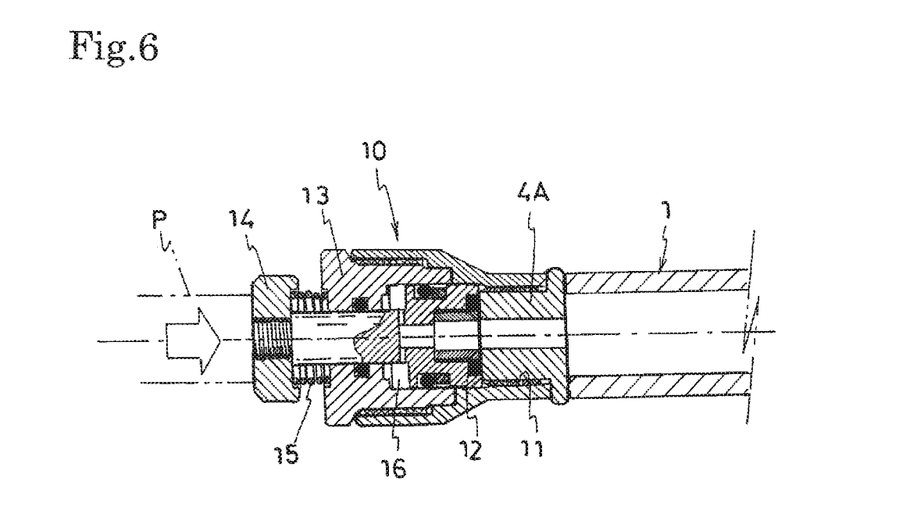
FIG. 6 is a cross-sectional view illustrating a state where a pressed part of the attached seal apparatus is pressed by a piston and a seal part is pressed into contact with the screw fastening part of the fuel delivery pipe.

Subsequently, as illustrated in FIG. 6, the pressed part 14 of the seal apparatus 10 according to the present invention is pressed by an external force of, for example, a piston P, to move the seal part 12 toward the screw fastening part 4A of the inspection object so that the seal part 12 is pressed into contact with the screw fastening part 4A. Thus, initial sealing can be achieved, a sufficient sealing force can be obtained at the start of the inspection, and in addition, the moving of the seal part 12 toward the screw fastening part 4A results in an increased volume of the accumulator 16 between the stopper part 13 and the seal part 12 and makes the spring 15 compressed.

Figure 7:
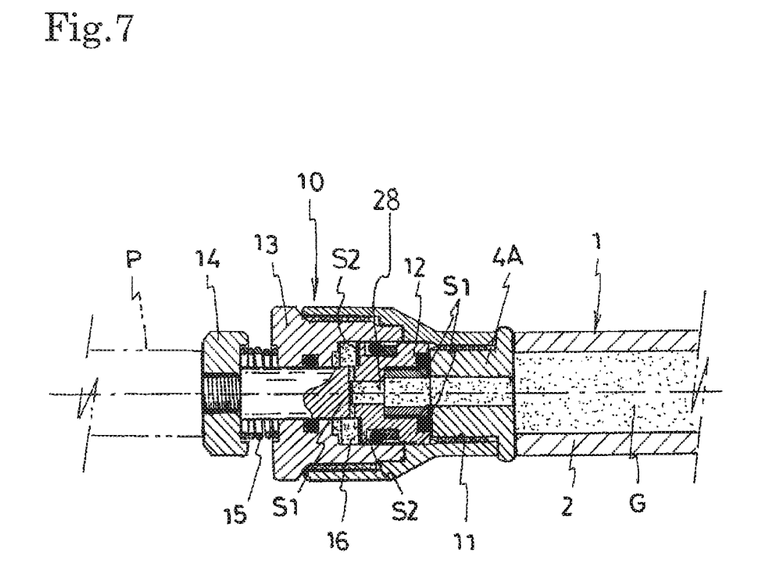
FIG. 7 is a cross-sectional view illustrating a state where a high-pressure test fluid is injected into a pipe main body of the fuel delivery pipe with the seal part of the seal apparatus being pressed in contact.

Subsequently, as illustrated in FIG. 7, a high-pressure test fluid (for example, helium gas of 25 MPa) G is injected into the pipe main body 2 of the fuel delivery pipe 1 which is the inspection object, and the inspection is then started. The injected test fluid G flows into the accumulator 16, which is formed between the stopper part 13 and the seal part 12, through the passage 28, so that the pressure inside the accumulator 16 of the seal apparatus 10 according to the present invention is the same as that of the high-pressure test fluid G. The seal part 12 is strongly pressed into contact with the screw fastening part 4A by a force generated due to a difference between an area S1 which receives the pressure of the test fluid G in the fuel delivery pipe 1 and an area S2 which receives the pressure of the test fluid G in the accumulator 16 [(S2−S1)×the pressure of the test fluid G], thereby achieving self-sealing. After a predetermined time, the pressure in the fuel delivery pipe 1 is measured with a pressure gauge to check the gas-tightness of the fuel delivery pipe 1.

Figure 8:
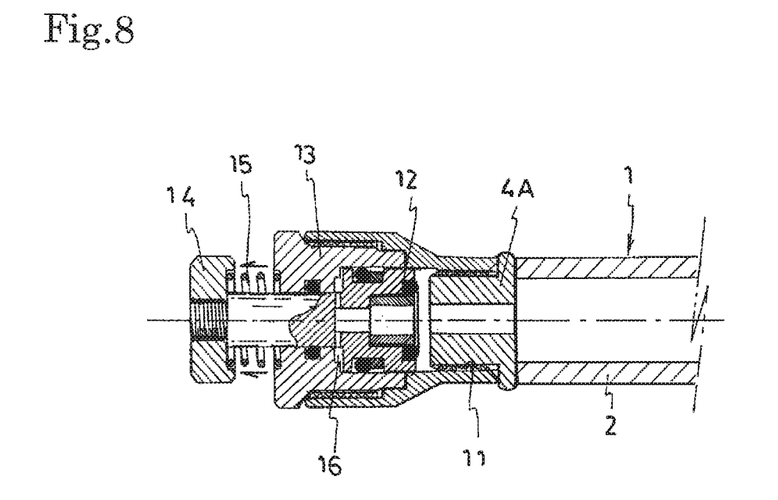
FIG. 8 is a cross-sectional view illustrating a state where a gas-tightness inspection is completed, the test fluid is drained from the fuel delivery pipe, and the piston pressing the pressed part is retracted.

When the gas-tightness inspection is completed, the test fluid G is drained from the fuel delivery pipe 1, and the piston P pressing the pressed part 14 is retracted. Then, as illustrated in FIG. 8, the pressure of the accumulator 16 is lowered, accordingly, the force for pressing the seal part 13 into contact with the screw fastening part 4A disappears, and the pressed part 14 is returned to the original position by the biasing force of the compressed spring 15, so that the seal part 12 is separated from the screw fastening part 4A. In this state, the internal thread part 11 is removed from the screw fastening part 4A. At this time, since the seal part 12 is separated from the screw fastening part 4A, there is no occurrence of twisting or wear in the seal part 12, and the durability of the seal part 12 is improved.

Figure 9:
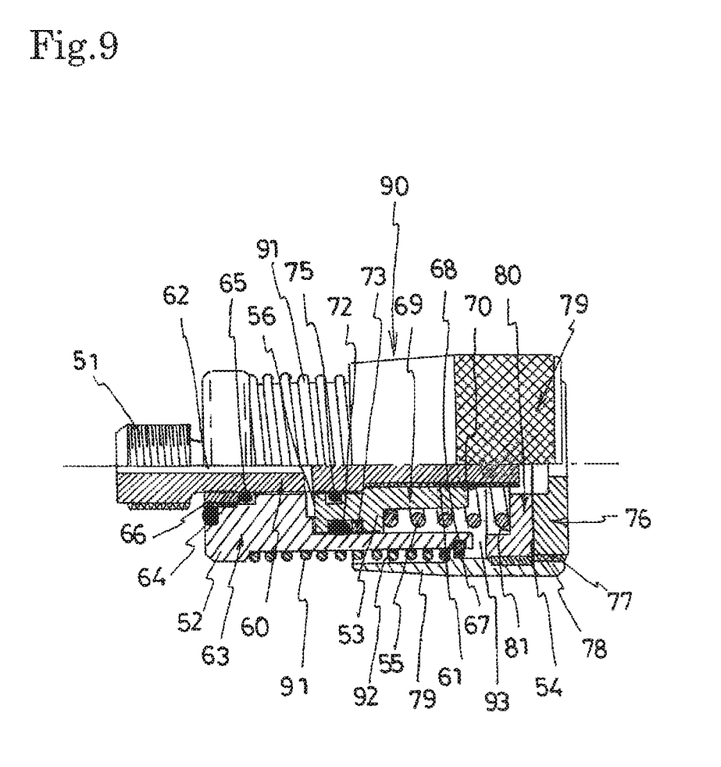
FIG. 9 is a half section side view illustrating one embodiment of the seal apparatus according to the present invention that seals the screw fastening part of an internal thread of the fuel delivery pipe.
Figure 10:
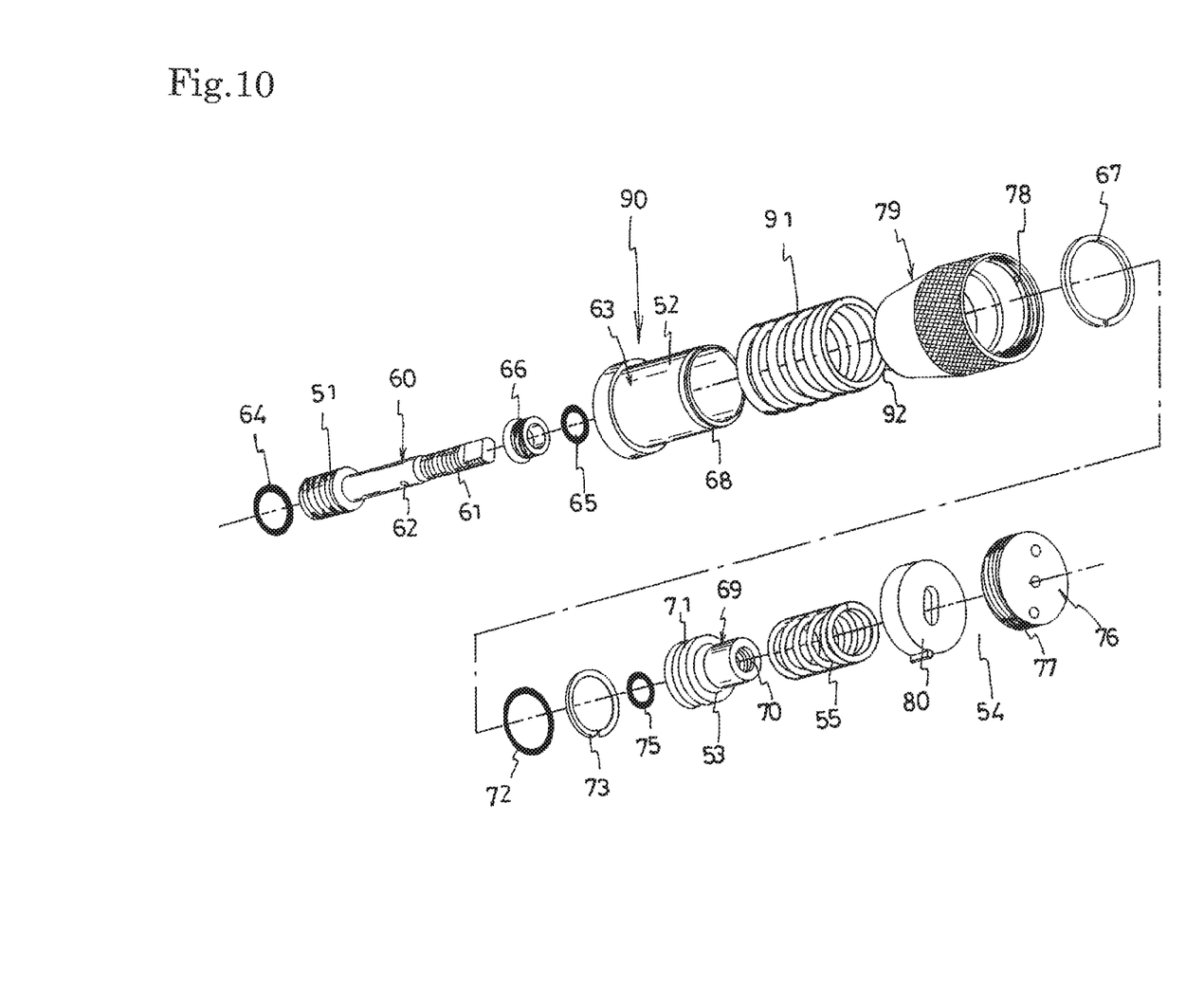
FIG. 10 is an exploded perspective view of the seal apparatus illustrated in FIG. 9.

Next, the structure of the seal apparatus 50 for sealing the screw fastening part 4B of the internal thread of the fuel delivery pipe 1 according to the present invention illustrated in FIGS. 1 and 2 will be described in detail with reference to FIGS. 9 and 10.

The illustrated seal apparatus 50 includes an external thread part 51 that is screwed to the screw fastening part 4B of the internal thread of the fuel delivery pipe; a seal part 52 that moves along the axis of the external thread part 51 to be pressed into contact with the screw fastening part 4B of the fuel delivery pipe; a stopper part 53 that is fixed to the external thread part 51 and restricts the movement of the seal part 52; a pressed part 54 that receives an external force to move along the axis of the external thread part 51 and moves the seal part 52 toward the screw fastening part 4B so that the seal part 12 is pressed into contact with the screw fastening part 4B; a spring 55 that is disposed between the pressed part 54 and the stopper part 53; and an accumulator 56 that is formed between the stopper part 53 and the seal part 52 and into which a test fluid G which is introduced into the fuel delivery pipe for inspection flows.

The external thread part 51, which is screwed to the screw fastening part 4B of the internal thread of the fuel delivery pipe, is formed on the outer peripheral surface of a bulging part of a rod body 60 having the bulging part on the front side. An external thread 61 screwed to the stopper part 53 is formed on the outer peripheral surface of the rod body 60 on the rear side. Further, a flow passage 62 communicating with the accumulator 56 is formed along the axis on the front side of the rod body 60.

The seal part 52, which moves along the axis of the external thread part 51 to be pressed into contact with the screw fastening part 4B of the fuel delivery pipe, is formed on a cylindrical body 63 having a projecting step part at its front outer periphery and having an enlarged diameter step part at its rear inner periphery. An O-ring 64 and an O-ring 65 are attached by a cylindrical screw 66 at the distal end and at the front outer periphery of the seal part 52, respectively. Further, on the outer periphery of the rear end of the cylindrical body 63, a recessed groove 68 to which a snap ring 67 is attached is formed.

The stopper part 53, which restricts the movement of the seal part 52, is formed in a cylindrical body 69 having a projecting step part at its front inner periphery. On the rear inner peripheral surface of the cylindrical body 69, an internal thread 70 is formed to be screwed to the external thread 61 formed on the rear outer peripheral surface of the rod body 60 having the external thread part 51. By screwing the thread 61 into the thread 70, the cylindrical body 69 having the stopper part is fixed to the rod body 60 having the external thread part. Further, an O-ring 72 and a backup ring 73 are attached to a recessed groove 71 formed on the outer periphery of the projecting step part of the cylindrical body 69 to achieve the sealing with the inner peripheral surface of the cylindrical body 63 having the seal part 52, and an O-ring 75 is attached to a recessed groove 74 formed on the inner periphery of the projecting step part of the cylindrical body 69 to achieve the sealing with the outer peripheral surface of the rod body 60 having the external thread part 51.

The pressed part 54, which receives an external force to move along the axis of the external thread part 51 and moves the seal part 52 toward the screw fastening part 4B so that the seal part 52 is pressed into contact with the screw fastening part 4B, is composed of a disk 76, a cylindrical body 79 having an internal thread 78 on its inner peripheral surface that is screwed to an external thread 77 formed on the outer peripheral surface of the disk 76, and a block 80 that is restricted in the cylindrical body 79 by the disk 76. The pressed part 54 also presses the seal part 52, which has the cylindrical body 63 restricted by the snap ring 67 in the cylindrical body 79, by the disk 76 through the block 80 to move the seal part 52 toward the screw fastening part 4B so that the seal part 52 is pressed into contact with the screw fastening part 4B. A recessed part 81 into which the rear end of the spring 55 is inserted is formed on the front end face of the block 80.

The spring 55 is disposed between the front projecting step part of the cylindrical body 69 having the stopper part 53 and the recessed part 81 formed on the rear end face of the block 80 having the pressed part 54 with the spring 55 wound around the outer periphery of the cylindrical body 69 having the stopper part 53. Further, the accumulator 56, which is formed between the stopper part 53 and the seal part 52 and into which the test fluid G which is introduced into the fuel delivery pipe for inspection flows, communicates with the front end face of the external thread part 51 through the flow passage 62 formed along the axis on the front side of the rod body 60 having the external thread part 51.

Also in the seal apparatus 50 according to the present invention used for sealing the screw fastening part 4B of the internal thread of the fuel delivery pipe 1 configured as described above, it is attached to the screw fastening part 4B to perform the gas-tightness inspection as in the seal apparatus 10 used for the screw fastening part 4A of the external thread of the fuel delivery pipe 1 described above, thereby making it possible to provide the same operation and effect.

That is, first, the external thread part 51 of the seal apparatus 50 according to the present invention is screwed to the screw fastening part 4B of the internal thread of the fuel delivery pipe 1 to attach the seal apparatus 50 to the screw fastening part 4B. At this time, there is a gap between the seal part 52 of the seal apparatus 50 according to the present invention and the screw fastening part 4B of the inspection object, and the seal part 52 does not come in contact with the screw fastening part 4B accordingly. Thus, there is no occurrence of twisting or wear in the seal part 52.

Subsequently, the pressed part 54 of the seal apparatus 50 according to the present invention is pressed by an external force of, for example, a piston, to move the seal part 52 toward the screw fastening part 4B so that the seal part 52 is pressed into contact with the screw fastening part 4B. Thus, initial sealing can be achieved, a sufficient sealing force can be obtained at the start of the inspection, and in addition, the moving of the seal part 52 toward the screw fastening part 4B results in an increased volume of the accumulator 56 between the stopper part 53 and the seal part 52 and makes the spring 55 compressed.

Subsequently, a high-pressure test fluid (for example, helium gas of 25 MPa) is injected into the pipe main body of the fuel delivery pipe, and the inspection is then started. The injected test fluid flows into the accumulator 56, which is formed between the stopper part 53 and the seal part 52, through the passage 62 formed along the axis of the external thread part 51, so that the pressure inside the accumulator 56 of the seal apparatus 50 according to the present invention is the same as that of the high-pressure test fluid. The seal part 52 is strongly pressed into contact with the screw fastening part 4B by a force generated due to a difference between an area which receives the pressure of the test fluid in the fuel delivery pipe 1 and an area which receives the pressure of the test fluid in the accumulator 56, thereby achieving self-sealing. After a predetermined time, the pressure in the fuel delivery pipe is measured with a pressure gauge to check the gas-tightness of the fuel delivery pipe.

When the gas-tightness inspection is completed, the test fluid is drained from the fuel delivery pipe, and the piston pressing the pressed part 54 is retracted. Then, the pressure of the accumulator 56 is lowered, accordingly, the force for pressing the seal part 53 into contact with the screw fastening part 4B disappears, and the pressed part 54 is returned to the original position by the biasing force of the compressed spring 55, so that the seal part 52 is separated from the screw fastening part 4B. In this state, the external thread part 51 is removed from the screw fastening part 4B. At this time, since the seal part 52 is separated from the screw fastening part 4B, there is no occurrence of twisting or wear in the seal part 52.

Figure 11:
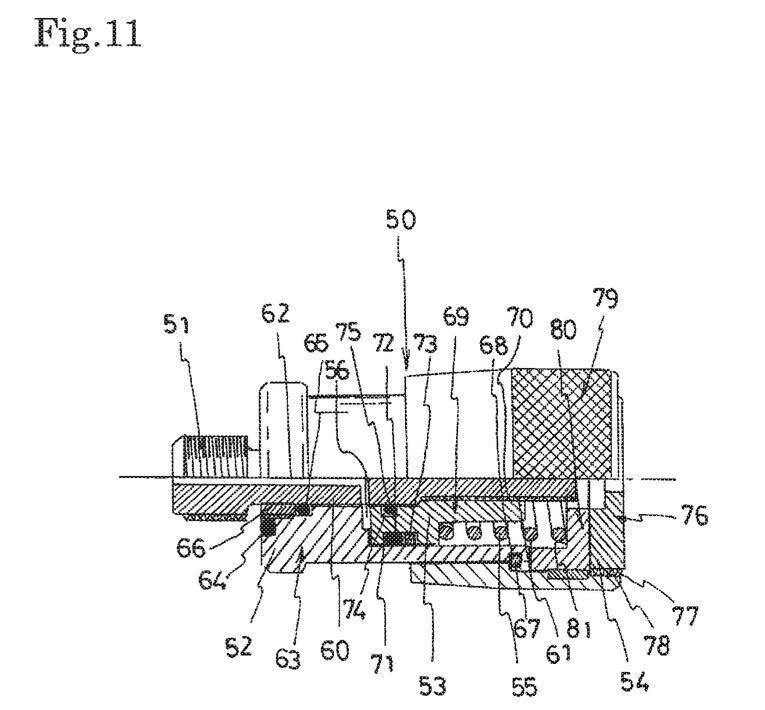
FIG. 11 is a half section side view illustrating another embodiment of the seal apparatus according to the present invention that seals the screw fastening part of the internal thread of the fuel delivery pipe.
Figure 12:
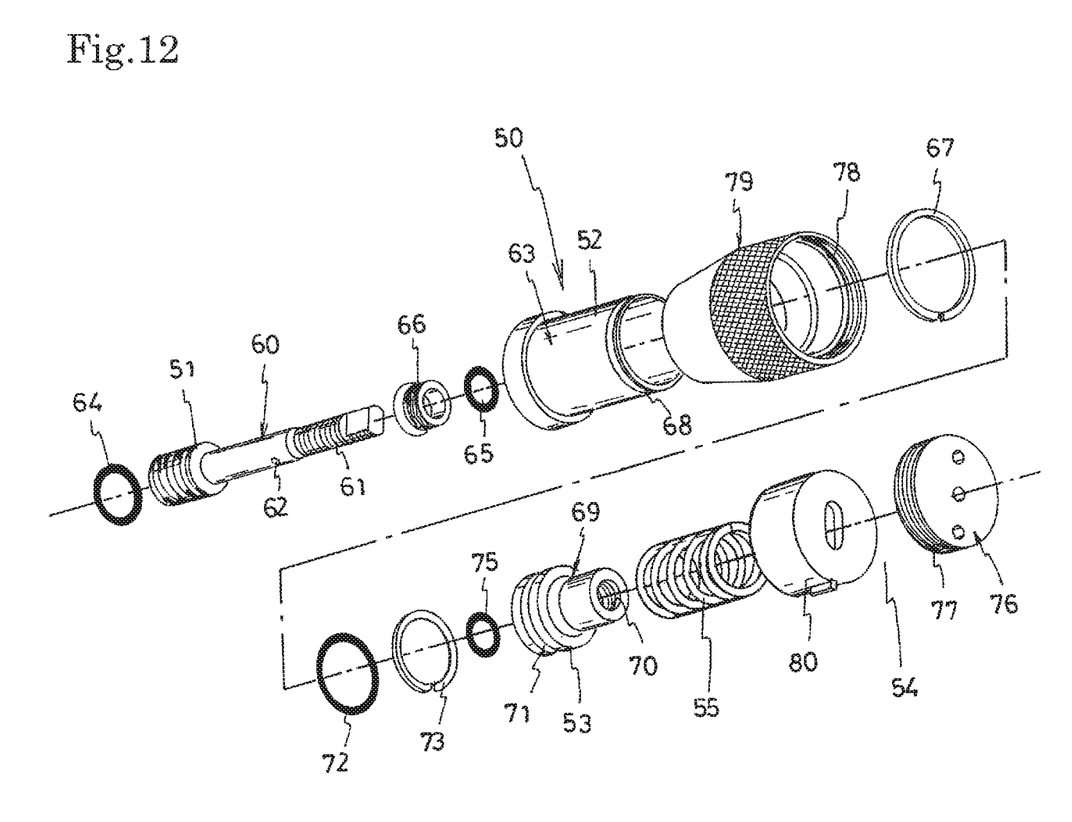
FIG. 12 is an exploded perspective view of the seal apparatus illustrated in FIG. 11.

A seal apparatus 90 illustrated in FIGS. 11 and 12 is of another embodiment of the seal apparatus 50 for sealing the screw fastening part 4B of the internal thread described above.

The seal apparatus 90 according to the embodiment illustrated in FIGS. 11 and 12 differs only in that a second spring 91 is disposed between the pressed part and the seal part, but has the same configuration as the other parts of the seal apparatus 50 described above. Accordingly, the same parts as those of the seal apparatus 50 illustrated in FIGS. 9 and 10 are designated by the same reference numerals, and the description thereof will be omitted.

In the seal apparatus 90 illustrated in FIGS. 11 and 12, an enlarged diameter step part 92 is formed on the front inner peripheral surface of the cylindrical body 79 having the pressed part 54, and the second spring 91 is disposed between the front projecting step part of the cylindrical body 63 having the seal part 52 and the enlarged diameter step part 92 formed on the front inner peripheral surface of the cylindrical body 79 having the pressed part 54 with the second spring 91 wound around the outer periphery of the cylindrical body 63 having the seal part 52. Further, the block 80 having the pressed part 54 has a thickness thinner than the block 80 of the seal apparatus 50 described above, and a gap 93 is formed between the block 80 and the rear end face of the cylindrical body 63 having the seal part 52.

In the seal apparatus 90 in which the second spring 91 is disposed between the pressed part 54 and the seal part 52 as described above, product errors of the screw fastening part 4B of the fuel delivery pipe which is the inspection object can be absorbed, in addition to the operation and effect of the seal apparatuses 10 and 50 described above.

In other words, in the seal apparatus 90, when the external thread part 51 is screwed to the screw fastening part 4B of the internal thread of the fuel delivery pipe 1 to attach the seal apparatus 90 to the screw fastening part 4B, and the pressed part 54 is then pressed by an external force of, for example, a piston, to move the seal part 52 toward the screw fastening part 4B so that the seal part 52 is pressed into contact with the screw fastening part 4B, the pressing force by the pressed part 54 is transmitted to the seal part 52 through the second spring 91. Therefore, even if the screw fastening part 4B of the inspection object has some length due to a product error, the spring 91 absorbs the error and the seal part 52 always presses the seal part 52 into contact with the screw fastening part 4B of the inspection object with an appropriate pressing force.

The embodiments of the seal apparatus according to the present invention have been described above, but the present invention is not limited to the above-described embodiments at all, and various modifications and alterations are possible within the scope of the present invention as technical ideas defined in the claims, as a matter of course.

For example, in the above embodiments, examples in which the seal apparatus according to the present invention is applied to the sealing of the screw fastening part 4 of the fuel delivery pipe 1 are provided, but it goes without saying that the gas-tight plug can be applied to the sealing of a screw fastening part formed in another hollow component.

Further, the shape and structure of each member composed of the seal apparatus according to the present invention, for example, a screw part screwed to a screw fastening part of a hollow component and a seal part pressing against a screw fastening part of a hollow component, is not limited to the shape and structure of each embodiment described above at all.

INDUSTRIAL APPLICABILITY

According to the seal apparatus of the present invention, it provides sufficient sealing and can be made to be compact and inexpensive as a whole, and thus in a gas-tightness inspection for an inspection object, for example, a hollow component manufactured by brazing or the like such as a fuel delivery pipe to which an injector of a vehicle engine is attached, it can be widely used as an apparatus for sealing a screw fastening part of the inspection object.

REFERENCE SIGNS LIST

1 Fuel delivery pipe
2 Pipe main body
3 Injector cup
4, 4A, 4B Screw fastening part
10, 50, 90 Seal apparatus
11, 51 Screw part
12, 52 Seal part
13, 53 Stopper part
14, 54 Pressed part
15, 55 Spring
16, 56 Accumulator
91 Second spring

The invention claimed is:

1. A seal apparatus for gas-tightly sealing a screw fastening part of a hollow component during a gas-tightness inspection, the seal apparatus comprising:
   a screw part that is for being screwed to the screw fastening part of the hollow component;
   a seal part that moves along an axis of the screw part and that is for coming into pressure contact with the screw fastening part of the hollow component;
   a stopper part that is fixed to the screw part and restricts the movement of the seal part;
   a pressed part that is capable of receiving an external force to move along the axis of the screw part and that is capable of moving the seal part toward the screw fastening part so that the seal part can come into pressure contact with the screw fastening part;
   a spring that is disposed between the pressed part and the stopper part, the spring being configured to apply a force to the pressed part so as to push back the pressed part when the pressed part is in a state of being moved towards the screw fastening part of the hollow component due to the external force; and
   an accumulator that is formed between the stopper part and the seal part, the accumulator functioning as a pressure reservoir and being configured to receive a test fluid which is introduced into the hollow component for inspection, so that the pressure of the test fluid therein presses the seal part towards the screw fastening part of the hollow component so as to press the seal part into contact with the screw fastening part.

2. The seal apparatus according to according to claim 1, wherein a second spring is disposed between the pressed part and the seal part.

3. The seal apparatus according to claim 1, wherein the screw part is an internal thread, and a flow passage communicating with the accumulator is formed in the seal part disposed inside a cylindrical body in which the internal thread is formed.

4. The seal apparatus according to claim 1, wherein the screw part is an external thread, and a flow passage communicating with the accumulator is formed in a rod body on which the external thread is formed.

\* \* \* \* \*